A. E. HOPKINS & O. S. FELLOWS.
AUTOMATIC FEEDING AND CUTTING MECHANISM FOR PLASTIC MATERIAL.
APPLICATION FILED FEB. 14, 1908.

1,082,331.

Patented Dec. 23, 1913.

UNITED STATES PATENT OFFICE.

ARCHIBALD E. HOPKINS AND OLIN S. FELLOWS, OF MIDDLETOWN, NEW YORK, ASSIGNORS TO IDEAL WRAPPING MACHINE COMPANY, A CORPORATION OF NEW YORK.

AUTOMATIC FEEDING AND CUTTING MECHANISM FOR PLASTIC MATERIAL.

1,082,331. Specification of Letters Patent. Patented Dec. 23, 1913.

Application filed February 14, 1908. Serial No. 415,873.

*To all whom it may concern:*

Be it known that we, ARCHIBALD E. HOPKINS and OLIN S. FELLOWS, citizens of the United States, and residents of Middletown, New York, have invented certain new and useful Improvements in Automatic Feeding and Cutting Mechanism for Plastic Material; and we do hereby declare that the following is a full, clear, and exact description of the same, reference being had to the accompanying drawings, and to the letters of reference marked thereon, which form a part of this specification.

This invention relates to that class of cutting and feeding mechanisms for plastic material shown in our prior application for wrapping machine, filed on the 3rd day of September, 1907, Serial No. 391,086, and in which said cutting mechanism was shown as means whereby the articles to be wrapped were cut or severed from a plastic strip, shaped to the required size and fed to the wrapping mechanism.

It is an object of this invention to provide cutting or sizing mechanisms adapted to be self feeding and adapted for any use requiring the cutting, severing, or shaping of material of a plastic or slightly plastic nature, independently of the delivery therefrom to a wrapping mechanism.

It is an object of this invention to afford an automatically acting rotative cutting mechanism by the use of which plastic or other material in strips may be severed into pieces of the same size and shape and delivered from the machine.

It is a further object of the invention to afford a self feeding, cutting or shaping mechanism which acts automatically to draw the plastic strip into position to be operated upon by the knives or cutters and which is provided with mechanism whereby the plastic material is pressed and kneaded upon the knives.

It is also an object of the invention to afford a construction whereby any broken pieces or fragments of the material may be permitted to escape from the machine without interfering with the action thereof.

It is also an object of the invention to afford means for scoring the strip on the side opposite the knives to facilitate severance thereof and in case of breakage to direct the fracture to the score.

It is a further object of the invention to provide a continuous, automatic, cutting and feeding mechanism adapted to reduce the plastic strip to pieces of uniform size and provided with means whereby the severed pieces are discharged automatically from the machine.

Finally it is an object of the invention to afford an automatic, self feeding, cutting and shaping mechanism, simple in construction, positive in operation and of such strength and durability as to obviate the necessity for skilled labor in the operation thereof.

The invention embraces many novel features and consists in the matters hereinafter described and more fully pointed out and defined in the appended claims.

In said drawings.

Figure 1:
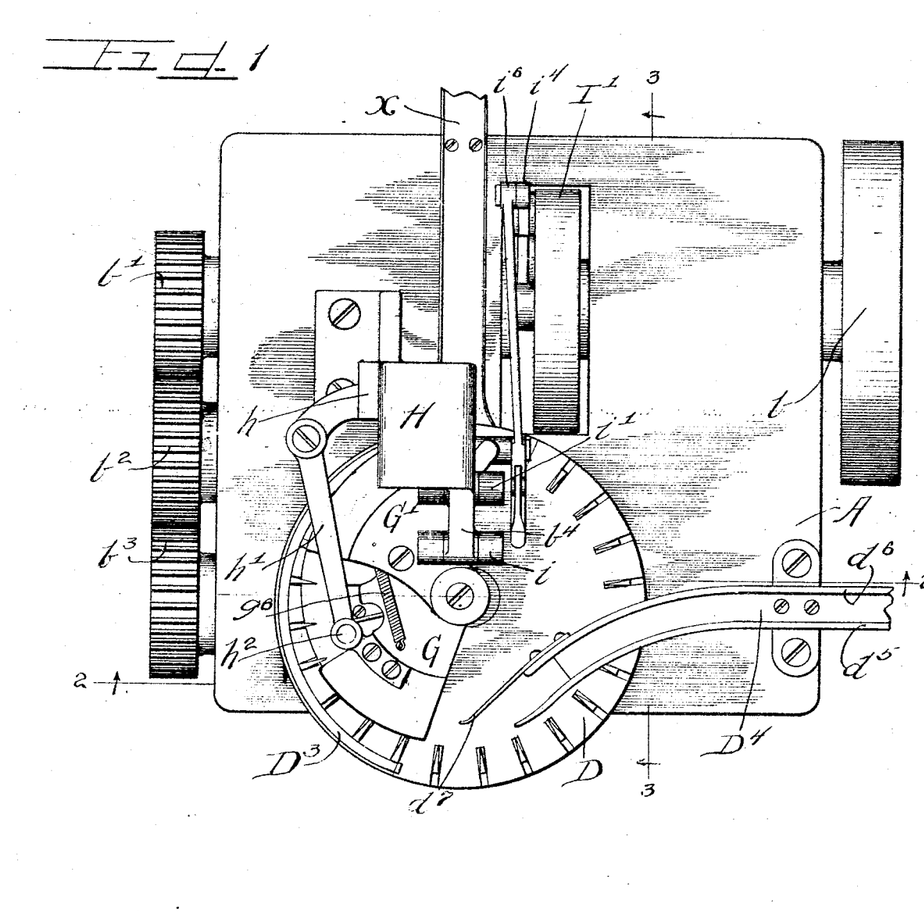
Figure 1 is a top plan view of a device embodying our invention.
Figures 2, 15:
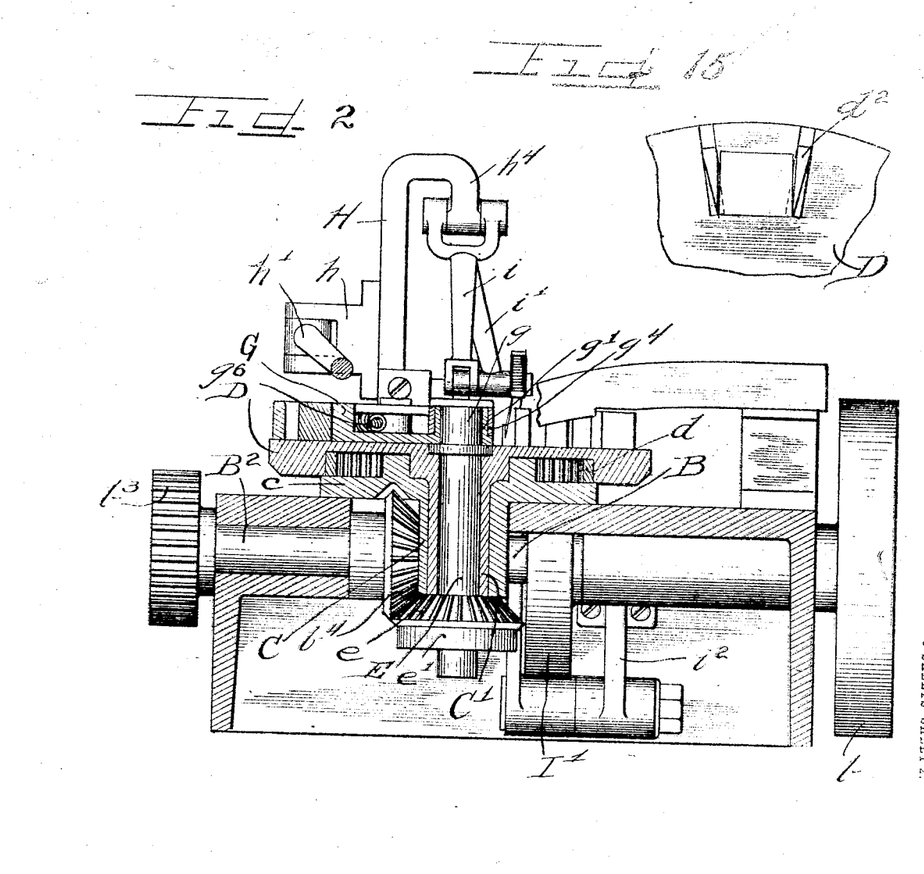
Fig. 2 is a section taken on line 2—2 of Fig. 1.
Figs. 12 to 16 are enlarged fragmentary details of construction.
Figure 3:
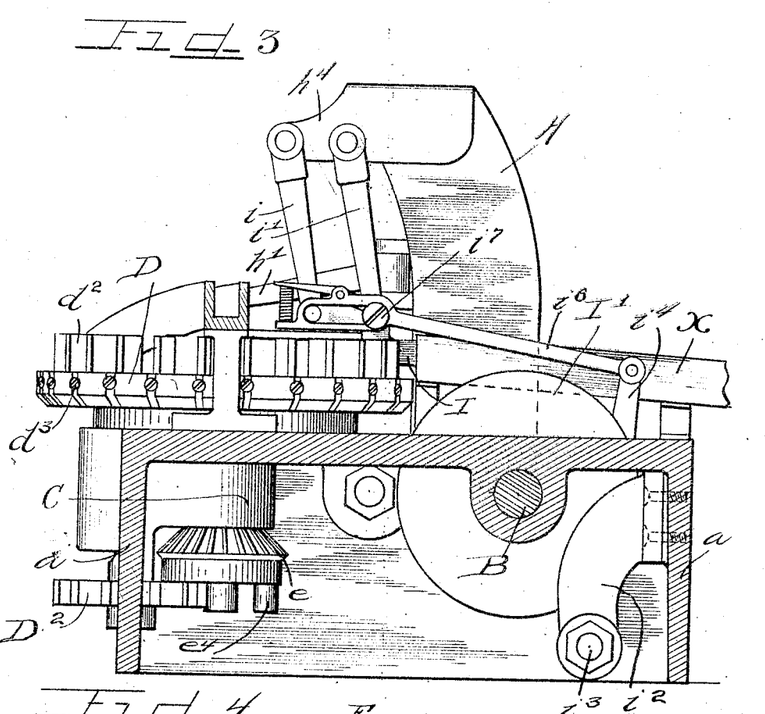
Fig. 3 is a section taken on line 3—3 of Fig. 1.
Figures 4, 13:
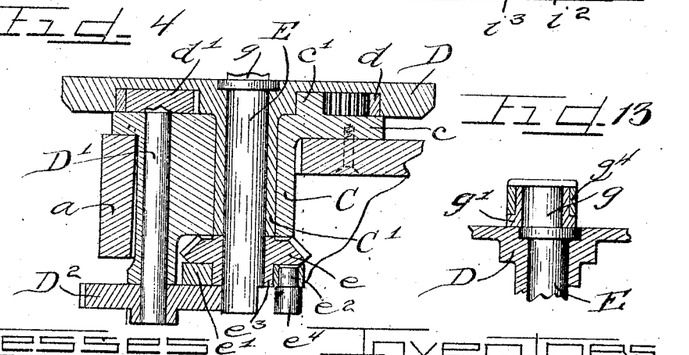
Fig. 4 is a section taken centrally from front to rear of the rotative cutting and feeding table.
Figure 5:
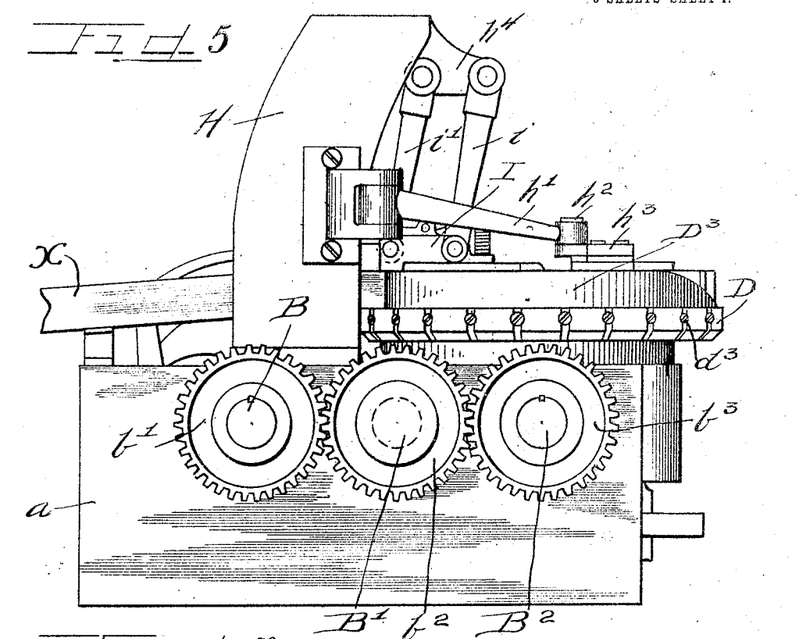
Fig. 5 is a view in elevation of the geared side of the machine.
Figure 6:
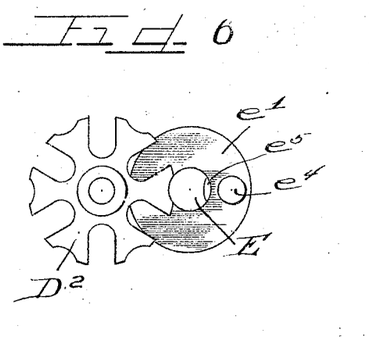
Fig. 6 is a detail face view of the Geneva gear and stop therefor.
Figure 7:
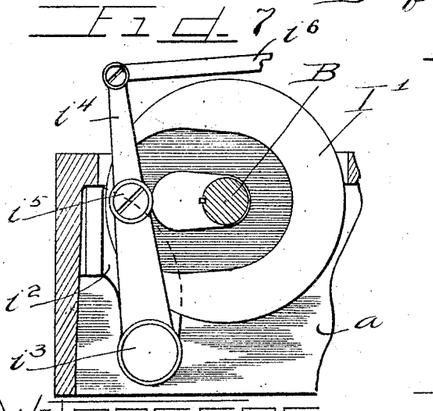
Fig. 7 is a fragmentary detail showing the lever and the cam for actuating the plunger.

As shown in the drawings: A comprises, as shown, a frame or table conveniently constructed of cast metal and provided at its sides with downwardly directed flanges *a*, which serve to strengthen the table and also to afford means for attaching certain parts of the operative mechanism thereto. Journaled transversely in said frame in suitable bearings and beneath the top of the table is the main driving shaft B, provided at one extremity with a driving pulley $b$, and at the other extremity with a gear $b'$ from whence the cutting mechanism is driven. As shown, a stud shaft B′ is rigidly secured on the end of said frame and rotatably secured thereon is a gear $b^2$ which meshes with the gear $b'$, and also with the gear $b^3$ rigidly secured on a shaft B² extending inwardly in suitable bearings beneath said table and provided on its inner end with a beveled gear $b^4$. Said table near the middle of the front side thereof is provided with an aperture extending through the top thereof and within the flange $a$, and seated and rigidly secured therein is a removable bearing member C, which as shown in Figs. 3 and 4, is provided at its upper end with a flange $c$ which fits upon the table and affords means for securing said bearing member in place. Said bearing member is provided with a central, vertical bore adapted to receive the elongated tubular hub C′ therethrough, which is integrally connected with the circular, rotative cutting and feeding table D, as shown in Figs. 2 and 4. As shown, the flange $c$ at the upper end of the bearing block C is provided adjacent the hub C′ of the cutting and feeding table with an upwardly directed flange $c'$, concentric with the hub and which projects into a broad, circular, concentric channel on the under side of said feeding and cutting table or wheel. Into the periphery of said channel is sprung and rigidly secured an annular member $d$, provided with inwardly directed gear teeth. Also journaled in said bearing member C, in advance of the bearing for said rotative cutting and feeding wheel is a shaft D′, provided at its upper end in said channel in the cutting wheel with a pinion $d'$, which meshes with the inwardly directed gear teeth within said table and whereby said table is revolved intermittently from the shaft B². For this purpose, as shown, a shaft E is journaled through the hub C′ of the cutting table and is provided at its lower end with a bevel gear $e$, which meshes with the bevel gear $b^4$ on the shaft B², and which acts to rotate said shaft E continuously. Rigidly secured on the hub $e^3$ of said gear $e$ is an adjustable disk $e'$ provided near its periphery with a pin $e^2$, on which is journaled an anti-friction roller $e^4$, as shown in Figs. 4 and 6 and which, as shown, is closely adjacent a notch or recess $e^5$, in the side and lower end of the shaft E. Rigidly secured on the lower end of the shaft D′ is a Geneva gear D², provided with radial slots or notches or throws affording between the same outwardly directed arms, each of which is concave at its extremity to fit to the convex surface of said shaft, as shown in Fig. 6, so that said shaft acts as a stop and lock therefor until the rotation of said shaft brings the recess $e^5$ into register with the end of the arms previously held and simultaneously the roller $e^4$ is engaged in a notch or throw of said gear whereby the rotation of the shaft actuates said Geneva gear for a partial revolution and consequently affords partial rotation for the cutting table. The extent of this rotation of the cutting table is, of course, dependent upon the size of the gear $d'$, which meshes with the internal gear of said table. In practice said rotational movement is equal to the length of the piece to be severed or in other words to the distance between adjacent knives $d^2$.

Figures 8, 9, 12, 16:
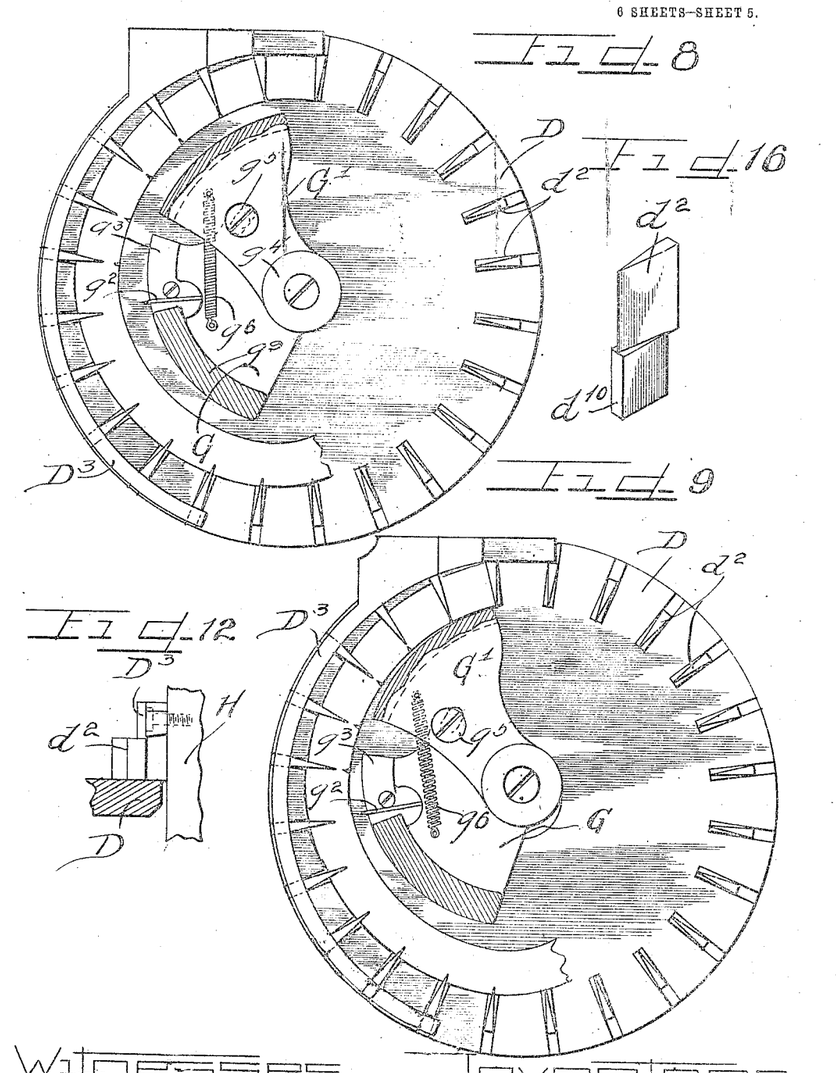
Figs. 8, 9, 10 and 11 are enlarged top plan views of the feed and cutting table with the presser-feet thereon partly in section and illustrating different stages in the operation thereof.
Figures 10, 11, 14:
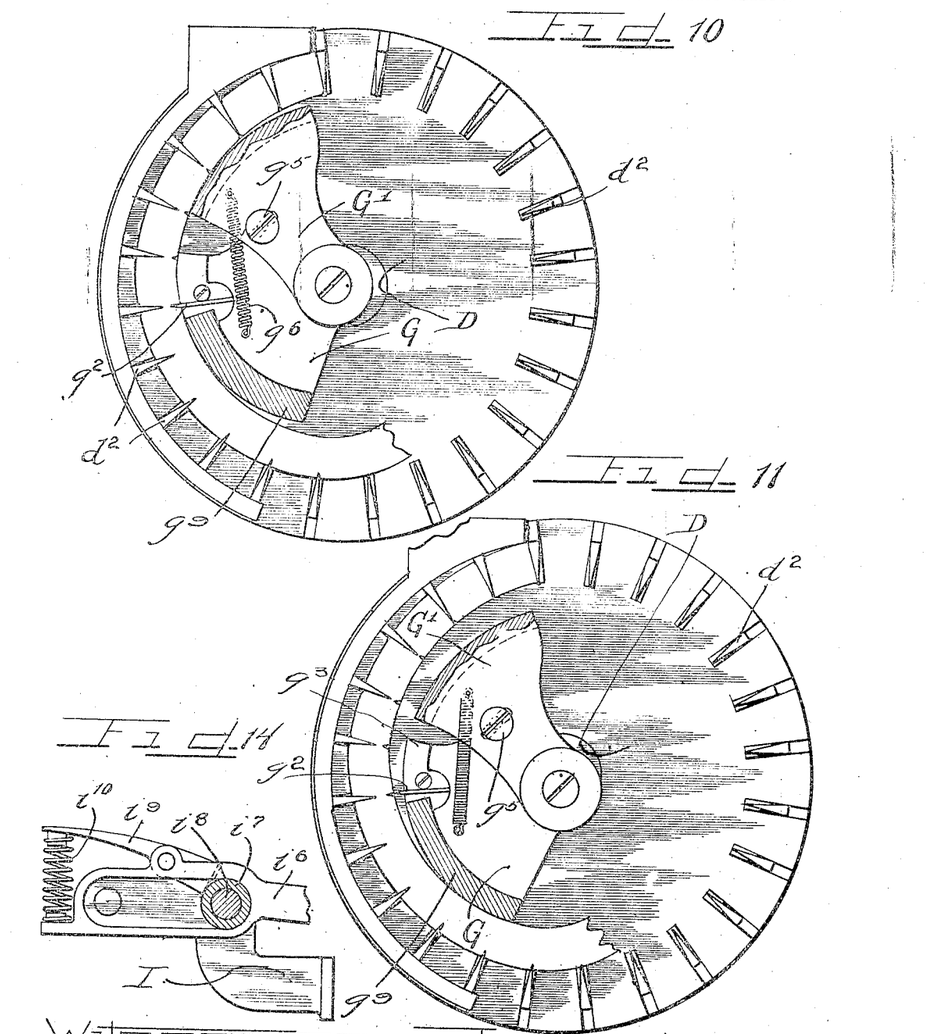

The cutting table, as shown, is radially slotted from the periphery inwardly at equal distances apart about its periphery and secured therein are the stationary knives $d^2$, as shown in Figs. 3, 5, 10 and 11. Said knives are ground on opposite sides to an angle to afford a slight clearance outwardly from the cutting edge, as shown in Figs. 15 and 16. In the construction shown an angle of approximately 13 degrees is sufficient. The shank $d^{10}$ of each knife is preferably ground in a line with the cutting edge so that the cutting edges always come to the same point in the circle on the cutting table thereby rendering adjustment very simple and permitting the knives to be ground until used up but always cutting the same size of caramel. Said knives are rigidly but removably secured in place in the cutting table by means of set screws $d^3$. In the construction shown, said knives face inwardly with their inner or cutting edges directed toward the center, and a spring guard plate or strip D³ is fitted around the cutting side of the cutting wheel or table and acts to hold the severed pieces in position until the severed piece has rotated to discharge position. The guard plate D³, is cut away at discharge position of the pieces and is shaped to provide a die, as shown in Fig. 12. Said die is formed with the top edge inclined and acts to smooth the ragged or feather edges of any caramel, also breaks off any projecting pieces and prevents any abnormally shaped caramels from being discharged. A feed chute D⁴ is rigidly supported upon the table and at its lower end curves downwardly and outwardly into close relation with the cutting edges of said knives within the cutting table, and is provided with side walls $d^5$—$d^5$, which act to deliver the plastic strip therethrough to the knives and for the purpose of insuring engagement of the strip with said knives a spring $d^7$ is rigidly secured on the inner walls $d^6$ of said chute and extends into close proximity with said cutting edges so as to exert a gentle pressure at all times in bearing the strip against the knives.

Means are provided for kneading the plastic strip upon the knives and back cutting or scoring the same opposite the knives. For this purpose an eccentric $g$ is provided on the upper end of the shaft E as shown in Fig. 13, and fitted thereon is the hub $g'$ of the presser foot G which at its outer edge is provided with an upwardly directed flange $g^9$ adapted to fit to the plastic strip and with the rotation of said shaft acts to press the strip inwardly upon the knives. A back knife $g^2$ is removably secured in the periphery of the presser-foot G by means of a plate $g^3$, secured on the presser foot and bearing against said knife and successively registers with the knives $d^2$ on the cutting table when said table is at rest, during which time said presser foot is in engagement with the strips. As shown, a second presser foot G', provided with a hub $g^4$ which fits over the hub $g'$ of the presser foot G, is also connected with said presser foot G by means of a screw or pin $g^5$ which is secured in one of said presser feet and projects into a slot in the other to permit said presser feet to each move relatively the other. Said presser feet are also yieldingly connected by means of a spiral spring $g^6$, which acts to return the presser feet G' to normal after each actuation.

Rigidly secured upon said table A, is an upright or standard H, on one side of which is rigidly engaged a bracket $h$, to which is pivotally engaged an arm $h'$, which projects over said cutting table and pivotally engages an upwardly directed pin $h^2$ rigidly engaged in any suitable manner to the presser foot G. This obviously prevents said presser foot moving around its shaft with the rotation of the cutting wheel and limits the movement thereof to a reciprocating and slightly rocking or kneading movement whereby said presser foot acts to force the strip upon the knives and the back knife $g^2$ into the inner side of the strip. The presser foot G' however, being yieldingly connected with the presser foot G, is permitted a slight rotational movement when retracted by the spring $g^6$ as indicated in Figs. 8 to 11 and kneads and presses the strip upon the knives during the outward throw of the eccentric and until the eccentric $g$ and spring $g^6$ withdraw the presser foot from engagement with the strip.

Means are provided for delivering the severed pieces from the wheel. For this purpose the laterally and downwardly directed upper edge $h^4$, of the standard H affords a pivotal support for depending links $i$—$i'$, the lower ends of which are pivotally connected with the plunger I, which normally lies within the knives in said cutting table and as shown, is provided with a downwardly directed head thereon which fits between the knives and is adapted to press the severed pieces therefrom and into the chute X. Means are shown for reciprocating said plunger comprising a cam wheel I' rigidly secured on the shaft B and provided in one of its faces with a cam groove. Rigidly secured on the inner side of the frame adjacent said cam is a bracket $i^2$, at the lower end of which is journaled a shaft $i^3$, which projects beneath said cam wheel and is provided on its opposite end with an upwardly directed lever $i^4$, from which a pin $i^5$ provided with an anti-friction roller as is usual, projects into the groove in said cam wheel. At the upper end of said lever is engaged a connecting rod $i^6$, the opposite end of which is pivotally connected with the end of the plunger in any suitable manner, as, for instance, on the same pivot as that for the link $i'$ whereby the rear end of said plunger is supported. Preferably engagement is effected in such a manner to insure release should the piece to be delivered be uncut or jam. For this purpose a roller $i^7$ is provided on the pivot pin $i^8$ and the end of said rod is slotted longitudinally of a width to receive said roller and the ends of the slot rounded to fit thereto. Pivoted on the end of said rod $i^6$, and with its rear end extending through a slot in the top thereof, is a lever $i^9$, the inner end of which engages said roller $i^7$ above the center pressing the same against the rear end of the slot. A spring $i^{10}$ is engaged between the outer end of the lever and the end of said rod and holds said lever normally in engagement with said roller but permits release when pressure becomes abnormal.

The operation is as follows: The plastic material being delivered through the feed chute $D^4$ onto the intermittently rotating cutting table, the spring $d^7$ presses the end against a knife and the partial rotations of the cutting wheel or table draw the end of said strip between the knives and said presser feet, as shown in Figs. 8 and 9. When the cutting table comes to rest by engagement of an arm of the Geneva gear $D^2$ with the shaft E, the continued rotation of said shaft moves the presser feet outwardly. The presser foot G' first engages the strip with a slight rocking movement, and presses and kneads the strip onto the knives until a piece or pieces at the inner end of the strip are severed. The presser foot G now engages the strip and rocks forwardly as the eccentric revolves back scoring the strip opposite one of the knives. The kneading engagement of the presser foot G on the strip does not begin until the presser foot G' is about to retract and continues for a brief interval after the retraction of said presser foot G' and until the rotational movement of the table begins. The spring connection between the presser foot G' and G permits a slight relative movement of the presser feet and is desirable to prevent the presser foot G' sliding on the strip owing to the greater linear distance on the strip from point of first contact by presser foot G' to back knife than from rear edge of presser foot G' to back knife. When the presser foot G' is retracted from the strip the spring $g^6$ returns it to normal relatively the presser foot G preparatory to another movement. This movement, of course, is continuous, the strips are gradually forced and kneaded upon the knives and severed into pieces of a length equal to the distance between knives and the severed pieces between the knives are carried thereby to position for discharge from the machine. When the cutting table comes to rest the cam I' has reached the position to begin its outward throw and engages the roller on the lever $i^4$, carrying the same outwardly and (actuating the plunger through the medium of the connecting rod $i^6$), forces the severed piece from the machine into the chute. The plunger is immediately retracted by further revolution of said cam to clear the knives preparatory to a repetition of the cycle of operation. Should the severed or partly severed piece resist the discharging action of the plunger to a degree to otherwise endanger breakage of parts, or should some foreign hard substance pass in with the plastic material, the abnormal resistance is sufficient to release the plunger from the rod $i^6$ by compression of the spring $i^{10}$ and the danger is obviated. Conveniently and preferably, the receiving end of the chute X is shaped to afford a die whereby severed pieces when discharged thereinto if of any abnormal proportions must be reduced to uniformity by the plunger in forcing the pieces therethrough.

It is obvious that inasmuch as the knives are uniformly spaced and ground as before described and rigidly engaged to the cutting table, each piece severed must be exactly the same length and size and can never jam in the machine. This uniformity is of gre importance should the machine be used in connection with a wrapping mechanism or should it be desired to wrap the articles manually after discharge from the cutting machine. Of course, if desired, the knives may be arranged in said cutting table to permit the plastic strip to be engaged from the outer side instead of from the inner, and the mechanism for delivering the strip upon the knives may be operated as before described excepting that in that instance, the presser feet should project beyond the cutting table and engage the strip by inward movement instead of outward movement. So too, the machine may be so constructed as to rotate continuously instead of intermittently, and very many details of construction may be varied without departing from this invention. We therefore do not purpose limiting this application for patent otherwise than necessitated by the prior art.

We claim as our invention:

1. A cutting mechanism embracing a rotative table for supporting the material, a knife set therein, means intermittently pressing the material supported on the table against the knife and means for rotating the table.

2. A cutting mechanism embracing a rotative table, a knife rigidly secured thereon, reciprocating means acting automatically to press the material to be cut against the knife and means for rotating the table to present fresh material to the knife.

3. A cutting mechanism embracing a rotative table, a plurality of knives rigidly secured thereon and spaced equal distances apart, means for rotating the table and means automatically and intermittently pressing the material to be cut on the knives.

4. A cutting mechanism embracing a rotative table, a plurality of knives carried thereby and spaced equal distances apart adapted to cut and carry the cut articles therebetween, positively actuated means supported on said table to intermittently deliver and press the material to be cut on the knives and means for rotating the table.

5. A cutting mechanism embracing a rotative table for carrying the material, a plurality of knives set therein at an angle with the plane thereof and spaced equal distances apart, means automatically and intermittently pressing the material to be cut on said knives and means for rotating the table.

6. In a device of the class described a rotative table for carrying and advancing the material to be cut, knives carried thereon, a chute adapted to deliver the material to be severed to one of said knives and means acting to press the material on the knives when drawn inwardly by the first knife.

7. In a device of the class described a rotative table, peripherally arranged knives carried thereon, means adapted to deliver the material to be severed to one of said knives to draw the same inwardly and reciprocating means acting to press the material onto the knives.

8. In a device of the class described a rotative table, peripherally arranged knives extending above the same, means adapted o deliver the material in a strip to one of the knives whereby it is drawn into the machine, means pressing the strip onto the knives and a back knife to score one side of the strip.

9. In a device of the class described a rotative table, knives carried thereon, means adapted to deliver the material to be severed to said knives, means pressing said material on the knives and a back knife to coöperate with the first named knives.

10. In a device of the class described a rotative element, knives carried thereon adapted to sever material pressed against the same and a positively actuated reciprocating back knife acting to score the material on the side opposite the other knives.

11. A device of the class described embracing a rotative cutting table, knives rigidly but removably secured thereon, means delivering a plastic strip to be severed by the knives on said table, mechanism acting to press said material upon the knives and a back knife adapted to partly sever the strip opposite the first named knives.

12. A device of the class described embracing a rotative cutting table, knives rigidly but removably secured thereon at an angle with its plane, means delivering a plastic strip to the knives on said table, mechanism acting to press said material upon the knives and means scoring the strip opposite each knife to partly sever it.

13. A device of the class described embracing a rotative cutting table, radially arranged knives rigidly but removably secured thereon, means delivering a plastic strip to the knives on said table, mechanism acting to knead said material upon the knives and a back knife operating with said kneading mechanism.

14. A device of the class described embracing a rotative cutting table, knives rigidly but removably secured thereon, means delivering a plastic strip to and pressing the same against the knives on said table, mechanism acting to apply a rolling pressure against the material to press the same upon the knives and a reciprocating back knife acting to partly sever said strip opposite each of the first named knives.

15. A device of the class described embracing a rotative cutting table, knives rigidly but removably secured thereon with their edges arranged at an angle with the plane of the table, means delivering a plastic strip to and engaging the same with the knives, a reciprocating presser foot acting to press said material upon the knives and a back knife carried on said presser foot.

16. In a device of the class described a plurality of knives rigidly secured at equal distances apart, means for delivering a plastic strip to the knives, and gyrating kneading mechanism acting to apply rolling pressure to said strip to press the same between said knives.

17. In a cutting mechanism rigidly secured knives and a presser foot carrying a back knife and acting to force material to be cut against said knives and to back cut the same opposite one of the knives.

18. In a cutting mechanism a movable table, knives arranged thereon, a presser foot acting to press the material to be cut against said knives and a back knife movable simultaneously with the presser foot and back cutting said material opposite each knife.

19. In a device of the class described a movable table, radially adjustable knives rigidly secured thereon at equal distances apart, means adapted to press plastic material upon said knives to sever the same into pieces of uniform size and reciprocating mechanism for delivering the severed pieces from said table.

20. In a device of the class described a rotative table, knives rigidly secured thereon at equal distances apart, means adapted to press plastic material upon said knives to sever the same into pieces of uniform size, a back knife coöperating with the fixed knives and mechanism for delivering the severed pieces from said table.

21. In a device of the class described a movable table, upstanding, inwardly facing knives rigidly secured thereon at equal distances apart, means acting to press plastic material upon said knives to sever the same into pieces of uniform size, and mechanism for delivering the severed pieces from said table.

22. In a device of the class described a movable set of parallel edged knives rigidly secured at equal distances apart, means actuating the same, a presser foot acting at an angle to press the material to be cut upon said knives, and mechanism for pressing the severed pieces from between the knives and delivering the same from the machine.

23. In a cutting machine a movable set of parallel edged knives rigidly secured at equal distances apart, means intermittently moving said set of knives, a presser foot acting to force the material to be cut against the knives, a back knife moving therewith to assist in the cutting and means acting when the knives are at rest to force the severed pieces from between the knives and from the machine.

24. In a cutting machine a movable set of parallel edged knives, means actuating said set, presser feet acting to force the material to be cut against said knives, a spring yieldingly connecting the presser feet, the inward feed of material being accomplished by the movement of the knives.

25. In a cutting machine for plastic material a set of knives having the cutting edges parallel, means moving said set of knives to feed the plastic material inwardly, a presser foot forcing the material upon the knives, a back knife carried thereon to partly sever the material from the rear, and means delivering the severed pieces from the machine.

26. A machine of the class described embracing knives movable to draw the material into cutting position, a presser foot applying rolling pressure to the material to force the same upon the knives, a reciprocating back knife and means delivering the severed material from the machine.

27. A machine for cutting plastic strips into uniform pieces embracing knives movable to draw the strip into cutting relation, a reciprocating and rocking presser foot acting to press the material on the knives, a reciprocating back knife and reciprocating means acting to force the severed pieces from the machine.

28. In a device of the class described an intermittently rotative cutting table, equally spaced knives thereon, automatic means acting to press the material to be severed against the knives and means thereon to partly sever the material from the rear.

29. In a device of the class described a rotative cutting table, equally spaced knives thereon, automatic means acting to press the material to be severed against the knives and a plunger acting to press the severed pieces from between the knives.

30. In a device of the class described an intermittently rotative cutting table, equally spaced knives thereon, automatic means acting to press the material to be severed outwardly against the knives and means acting when the table is at rest to press the material severed, from between the knives.

31. In a device of the class described an intermittently rotative cutting table, equally spaced upstanding and inwardly facing knives thereon and automatic means acting from within to press the material to be severed outwardly against the knives.

32. In a device of the class described an intermittently rotative cutting table, equally spaced upstanding, peripheral, inwardly facing knives thereon, automatic means acting from within to press the material to be severed outwardly against the knives and a back knife coacting with the peripheral knives.

33. In a device of the class described an intermittently rotative cutting table, equally spaced peripheral, inwardly facing knives thereon, automatic means operating from within to press the material to be severed outwardly against the knives and a back knife carried on the pressing means.

34. In a cutting machine for plastic strips an intermittently rotative table, upstanding, inwardly facing, peripheral knives secured thereon, presser feet actuated from the middle, one acting when the table is at rest, to press the strip against the knives and a back knife carried on one of the presser feet.

35. A cutting mechanism for strips of plastic material, embracing a rotative table, upstanding, inwardly facing, peripheral knives thereon, presser feet acting to press the plastic material against the knives and automatically operating means acting when the table is at rest for delivering severed pieces from the machine.

36. A cutting mechanism for plastic material embracing an intermittently rotative table, upstanding, inwardly facing, peripheral knives thereon, rocking and reciprocating presser feet actuated from within for pressing the material against the knives, a back knife carried on one or both the presser feet and automatically operating means acting while the table is at rest to deliver severed pieces from the machine.

37. In a machine of the class described presser feet having a reciprocating and a rocking movement and one of the same capable of a slight rotational movement and a cam for actuating both presser feet.

38. In a machine of the class described presser feet, one having a reciprocating and rocking movement, the other a reciprocating, rocking and a slight rotational movement, a cam common to both for actuating the same and a spring connecting said presser feet to move one rotationally.

39. In a machine of the class described presser feet, one having a reciprocating and rocking movement, the other reciprocating, rocking and a slight rotational movement, a cam common to both for actuating the same successively, a spring connecting said presser feet to move one rotationally and a back knife carried on one of the presser feet.

40. A cutting mechanism for plastic strips embracing an intermittently rotative table, upstanding, inwardly facing, peripheral knives thereon, presser feet, a cam common to both for successively actuating the same to press the plastic material against the knives, a back knife on one presser foot and automatically operating means acting when the table is at rest for delivering severed pieces from the machine.

41. A cutting mechanism for plastic material embracing an intermittently rotative table, upstanding, inwardly facing knives arranged equal distances apart on the periphery of the table, presser feet between which and the knives the strip to be cut is drawn by the knives, a cam actuating the presser feet successively to force the strip on the knives, a back knife movable simultaneously with one presser foot, an automatically operating plunger for delivering severed pieces from between the knives and a guard holding said pieces in place until opposite the plunger.

42. A cutting mechanism for plastic strips embracing an intermittently rotative table, upstanding, inwardly facing knives thereon arranged about the periphery, means pressing the ends of the strips against the knives to draw the strips inwardly thereby, means pressing the strip upon the knives between rotations of the table and automatically operating means for delivering severed pieces from the machine.

43. A cutting mechanism for plastic strips embracing a rotative table, upstanding, inwardly facing knives thereon arranged about the periphery, presser feet operated from within the circle of knives, a spring pressing the end of the strip to be severed against one of the knives whereby said knife draws the strip between the knives and the presser feet, means actuating the presser feet when the table is at rest to press the strip onto the knives, a back knife acting with the presser feet and means for delivering severed pieces from between the knives.

44. A device of the class described embracing an intermittently rotating table and means for actuating the same to afford equal partial revolutions, upstanding knives on the periphery of the table, a presser foot adapted to press the material to be cut upon said knives and means actuating the same during the interval of rest of the cutting table.

45. A device of the class described embracing a circular table, upstanding, inwardly facing, equally spaced knives on the periphery thereof, means intermittently rotating the table the distance between adjacent knives, presser feet positively actuated to press plastic material upon said knives and means actuating the presser feet to impart successive rolling pressure from each.

46. A device of the class described embracing a circular table, upstanding, inwardly facing, equally spaced knives on the periphery thereof, means intermittently rotating the table, the distance between adjacent knives, yieldingly connected presser feet, an eccentric operating both to press the material upon said knives, a link limiting one of the presser feet to reciprocating and rocking motion and a yielding connection between said presser feet.

47. A cutting mechanism for plastic strips embracing a table, upstanding knives on the periphery thereof, arranged equal distances apart, means intermittently rotating the table a distance equal to that between adjacent knives, a chute adapted to deliver the end of each strip to one of the knives whereby the strip is drawn into the machine, yieldingly connected presser feet, means actuating the presser feet successively, one at least acting during the interval of rest of the cutting table and a link holding one of the presser feet from rotational movement.

48. In a machine adapted to cut plastic material to pieces of predetermined size, a guard peripherally surrounding a part of the rotative cutting table and knives, and apertured to form a die to admit the cut pieces therethrough and smooth any rough piece.

49. A cutting mechanism for plastic strips comprising a table, upstanding knives on the periphery thereof spaced equal distances apart, means intermittently rotating said table a distance equal to the distance between adjacent knives then locking the table from movement, means delivering the end of each strip to one of the knives whereby the strip is drawn into the machine, automatically actuated presser feet acting to press the plastic strip upon said knives, a cam actuating both, one at least acting during the interval of rest of the cutting table and a positively actuated plunger adapted to press the severed pieces from between the knives.

50. A device of the class described embracing a rotating table and means for actuating the same to afford equal partial rotations, upstanding knives on said table at the periphery thereof, yieldingly connected presser feet to press the material upon said knives, means actuating the same to impart a reciprocating rolling movement, against the material, one acting while the table is at rest and a spring connecting the presser feet and affording a slight rotational movement thereof while retracting.

51. In a device of the class described a discharge mechanism acting normally to press the severed pieces from between the knives and a detent connected therewith acting to release at abnormal pressure exerted by said discharge mechanism.

52. The combination with a rotative cutting mechanism of an oscillating plunger acting across the face thereof to discharge successively each of the severed pieces and means actuating the same.

53. In combination with knives arranged about a common center and means pressing material to be severed thereon of a discharge mechanism acting between the knives to press the pieces therefrom and a release mechanism throwing the same out of action when opposed by abnormal resistance.

54. In combination with knives arranged about a common center and means pressing material to be severed thereon of a discharge mechanism acting between the knives to press the pieces therefrom and a spring controlled release mechanism acting to throw the same out of action when opposed by abnormal resistance.

55. A cutting mechanism comprising a rotatable table surrounded by upstanding knives facing the center of the table, means pressing the material to be severed thereagainst, a reciprocating discharge element, means actuating the same positively and a spring pressed lever acting to release the same when pressure is abnormal.

56. In a device of the class described embracing a rotative cutting table and knives thereon, of means actuating the table, kneading mechanism to press the material to be cut on the knives, a positively actuated plunger suspended to swing across the face of the table, a rod for actuating the same having a slot therein to engage a part on the plunger and a lever normally engaging said rod in operative relation with the plunger.

57. In a device of the class described knives and a kneading member having a constantly variable axis of operation acting to press the material with rolling pressure thereagainst.

58. In a device of the class described knives, a kneading member, means reciprocating and rocking the same to press the material to be cut against the knives, a back knife carried thereby and a swinging discharge element acting to press the severed material from between the knives.

59. A cutting mechanism embracing a plurality of horizontally rotatable knives arranged about a common center and means having a variable axis of operation for pressing a plastic strip between the same to sever the same into uniform pieces.

60. A cutting mechanism embracing radially directed knives arranged about a common center having inwardly facing sharp edges and means pressing a plastic strip against the same from within outwardly.

61. A cutting mechanism embracing self-feeding, radially directed knives arranged about a common center, means delivering a plastic strip thereto and reciprocating means acting successively with said knives to sever said strip and intermittently force the severed articles between the knives.

62. A cutting mechanism for plastic material embracing self-feeding, movable knives sharpened and set to provide a greater width between the same beyond the cutting edges than at the cutting edges, and reciprocating means coacting therewith intermittently to press the material on and between adjacent knives.

63. A cutting mechanism embracing a plurality of radially directed, self-feeding knives arranged about a common center, said knives sharpened on their inwardly facing edges and set to provide clearance beyond the cutting edge and a reciprocatable knife adapted to successively coact with said knives.

64. A cutting mechanism embracing movable, self-feeding knives arranged about a common center and means including a back knife coacting with each to sever plastic material uniformly therebetween.

65. A cutting table, peripheral knives thereon, presser feet acting to force the material to be cut thereagainst and a cam actuating said presser feet successively.

66. A rotative cutting table, peripheral knives thereon, a rotative cam, presser feet actuated thereby to coact with the knives, a link engaging one of said presser feet whereby rolling and reciprocating motion is imparted thereto and a yielding connection between the presser feet whereby the other presser foot is retracted effecting a slight rotational movement.

67. A cutting table, knives arranged around the periphery thereof, means delivering and pressing plastic material to and on the same, a discharge mechanism and a die positioned to receive the severed pieces therethrough.

68. An intermittently rotative cutting table, knives thereon, a constantly rotative cam, presser feet actuated thereby to press the material on the knives, and a back knife rigidly secured on one presser foot and successively coacting with said knives to back score the material.

69. In a device of the class described a rotative table, knives secured peripherally thereon, means actuated from within to press the material to be cut on said knives, a chute to receive the severed material from the knives, a die at the receiving end of the chute through which the material is pressed and a plunger acting from within the table to press the material through said die.

70. In a cutting mechanism a plurality of knives arranged in a circle equal distances apart and facing inwardly and adapted to rotate in a horizontal plane.

71. In a cutting machine, knives arranged in a circle equal distances apart and each having part of the front vertical surface ground to a cutting edge, the front surface of the shank and the cutting edge being in alinement and facing the center of the circle.

72. In a cutting machine a circular cutting table having radial slots extending from the periphery equal distances inward and a knife in each slot, each having the front edge of the shank and the cutting edge in vertical alinement and facing the axis of the table.

73. In a cutting machine a circular cutting table having radial slots extending from the periphery equal distances inward and a knife in each slot, each having the front edge of the shank and the cutting edge in a vertical plane and directed toward the axis of the table and a set screw engaged in the table and pressing the shank firmly in its seat.

74. In a cutting machine, a circular cutting table, radial slots opening through the periphery and of equal length, a radially directed knife in each slot having the cutting edge facing the axis of the table and extending vertically and the front edge of its shank and cutting edge in vertical alinement, said knives being so sharpened and set that a clearance is afforded beyond the cutting edges.

75. In a machine of the class described, knives each having a shank, the front edge of which is in alinement with the vertical cutting edge and the blade of such thickness as to afford a clearance back of the cutting edges on each side of each knife when the knives are set in a circle and means including a reciprocating knife coacting with each of said first mentioned knives to sever material uniformly therebetween.

76. A cutting machine embracing outer revolving knives and a single inner knife adapted to coact successively with each rotating knife as it passes thereby.

77. A cutting mechanism comprising intermittently revolving knives and a reciprocating knife adapted to coact with each rotating knife.

78. A cutting mechanism embracing coacting, revolving and reciprocating knives for severing the material.

79. A cutting mechanism embracing coacting revolving and reciprocating knives for severing the material, and means for kneading and shaping the cut articles.

80. A cutting mechanism embracing a rotating element, knives secured thereto and independently removable, oscillating and reciprocating means for coacting with the knives in shaping and cutting the material into uniform sized pieces and a releasable plunger for forcing the pieces from the rotating element.

81. A cutting mechanism embracing supporting means, knives thereon for severing the material, a Geneva gear for intermittently advancing the support and means for discharging the severed pieces between each advancement of the support.

82. In a device of the class described mechanism for cutting a strip of plastic material into equal sized pieces and a stationary die through which each piece passes when discharged from the machine.

83. In a device of the class described mechanism for cutting a plastic strip into pieces, means for ejecting the pieces when cut from the cutting mechanism and a die adapted to smooth and shape the pieces during discharge thereof.

84. In a device of the class described a rotating table, knives secured around the periphery thereof, a guard plate extending partly around the table, said guard plate apertured and shaped to provide a die.

85. In a device of the class described a rotating table, knives secured around the periphery thereof, a guard plate extending partly around the table, said guard plate apertured and shaped to provide a die, means for intermittently rotating the table and stopping the table in position to discharge through said die.

86. In a device of the class described a rotating table, knives secured around the periphery thereof, a guard plate extending partly around the table, said guard plate apertured and shaped to provide a die, means for intermittently rotating the table and stopping the table in position to discharge through said die, and yielding mechanism for forcing the material cut by the knives through the die.

87. A cutting mechanism comprising intermittently moving knives and a reciprocating knife adapted to successively coact in the same plane with each of said moving knives.

88. A cutting mechanism comprising knives and mechanism operated from a shifting axis for kneading and forcing the material onto the knives.

89. In a device of the class described, a support, knives secured thereto and coacting members for forcing the material against the knives, both of said members having the same axis which constantly changes position when operating.

In testimony whereof we have hereunto subscribed our names in the presence of two subscribing witnesses.

ARCHIBALD E. HOPKINS.
OLIN S. FELLOWS.

Witnesses:
RUSSELL WIGGINS,
CHARLES C. REDFIELD.